United States Patent
Kim et al.

(10) Patent No.: US 10,180,528 B2
(45) Date of Patent: Jan. 15, 2019

(54) BACKLIGHT UNIT AND DISPLAY APPARATUS INCLUDING THE SAME

(71) Applicant: Samsung Display Co., Ltd., Yongin-Si, Gyeonggi-Do (KR)

(72) Inventors: Kyung-Min Kim, Hwaseong-si (KR); Ho-sik Shin, Gunpo-si (KR); Hayoung Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/666,060

(22) Filed: Aug. 1, 2017

(65) Prior Publication Data
US 2018/0095215 A1    Apr. 5, 2018

(30) Foreign Application Priority Data
Sep. 30, 2016    (KR) .......................... 10-2016-0127046

(51) Int. Cl.
*F21V 8/00*    (2006.01)

(52) U.S. Cl.
CPC ......... *G02B 6/0036* (2013.01); *G02B 6/0061* (2013.01)

(58) Field of Classification Search
CPC .............................. G02B 6/0036; G02B 6/0061
USPC ........................................................ 362/611
See application file for complete search history.

(56) References Cited

U.S. PATENT DOCUMENTS

| | | | |
|---|---|---|---|
| 6,827,456 B2 * | 12/2004 | Parker | F21V 5/00 362/330 |
| 8,066,393 B2 * | 11/2011 | Takahashi | G02B 6/0036 362/606 |
| 9,785,006 B2 * | 10/2017 | Shinkai | H04N 13/0454 |
| 2013/0223096 A1 * | 8/2013 | Kim | G02B 6/0021 362/608 |
| 2017/0363798 A1 * | 12/2017 | Hirayama | G02B 6/0055 |

FOREIGN PATENT DOCUMENTS

| | | |
|---|---|---|
| JP | 2003140126 A | 5/2003 |
| KR | 100825904 B1 | 4/2008 |
| KR | 1020120038356 A | 4/2012 |
| KR | 101350590 B1 | 1/2014 |
| KR | 1020150067836 A | 6/2015 |
| KR | 1020160060862 A | 5/2016 |

* cited by examiner

*Primary Examiner* — Seung H Lee
(74) *Attorney, Agent, or Firm* — Cantor Colburn LLP

(57) ABSTRACT

A backlight unit includes a light source for generating light and a light guide plate for guiding the light in an upward direction, a top surface of the light guide plate includes a plurality of first and second lens patterns which extend in a first direction, the first lens pattern and the second lens pattern are alternately arranged in a second direction crossing the first direction, and a width the first lens pattern in the second direction increases gradually from a first width to a second width greater than the first width and then decreases gradually from the second width to the first width repeatedly along the first direction.

20 Claims, 13 Drawing Sheets

BACKLIGHT UNIT AND DISPLAY APPARATUS INCLUDING THE SAME

This application claims priority to Korean Patent Application No. 10-2016-0127046, filed on Sep. 30, 2016, and all the benefits accruing therefrom under 35 U.S.C. § 119, the content of which in its entirety is herein incorporated by reference.

BACKGROUND

Exemplary embodiments of the invention relate to a backlight unit and a display apparatus including the same, and more particularly, to a backlight unit which may enhance light collecting efficiency and light emission efficiency, and a display apparatus including the same.

Generally, a display apparatus may include a display panel for displaying an image using light, and a backlight unit for generating the light and providing the generated light to the display panel. The display panel may include a first substrate in which a plurality of pixels are disposed, a second substrate facing the first substrate, and an image display layer disposed between the first and second substrates. As the backlight unit, an edge type backlight unit which generates the light on a side of the display apparatus may be used.

Generally, the image display layer may be driven by the pixels, and transmittance of the light provided to the display panel from the backlight unit may be adjusted by the image display layer to display an image. The image display layer may be a liquid crystal layer, an electrowetting layer, or an electrophoretic layer.

Generally, the edge type backlight unit may include a light source for generating light, a light guide plate for guiding the light provided from the light source in an upward direction towards the display panel disposed thereabove, and an optical sheet which is disposed between the light guide plate and the display panel, and diffuses and collects the light provided from the light guide plate to provide the diffused and collected light to the display panel.

SUMMARY

A light guide plate with a flat top surface used in the edge type backlight unit may have low light emission efficiency. Exemplary embodiments of the invention are directed to a backlight unit which may enhance light collecting efficiency and light emission efficiency, and a display apparatus including the same.

An exemplary embodiment of the invention provides a backlight unit including a light source configured to generate light; and a light guide plate configured to guide the light provided from the light source in an upward direction. A top surface of the light guide plate includes a plurality of first and second lens patterns configured to extend in a first direction, and each of the first lens patterns and each of second lens patterns are alternately arranged in a second direction crossing the first direction. A width of each of the first lens patterns in the second direction increases gradually from a first width to a second width greater than the first width and then decreases gradually from the second width to the first width repeatedly along the first direction.

In an exemplary embodiment, the light source may be disposed to be adjacent to either of both sides of the light guide plate facing each other in the first direction.

In an exemplary embodiment, a cross section of each of the first and second lens patterns taken along a first plane perpendicular to the second direction may have a plurality of mountain patterns protruding in the upward direction.

In an exemplary embodiment, each of the first lens patterns and each of the second lens patterns may be disposed to be spaced apart at a predetermined interval in the second direction, and the interval may be from about five micrometers to about ten micrometers.

In an exemplary embodiment, each of the first lens patterns may include a plurality of first lens units arranged in the first direction and coupled to each other, each of the second lens patterns may include a plurality of second lens units which have the same shapes as the first lens units, have widths, in the second direction, complementary to those of the first lens units, and are arranged in the first direction and coupled to each other, and a cross section of each of the first and second lens units taken along a second plane perpendicular to the first direction may have a convex lens shape convexly protruding in the upward direction.

In an exemplary embodiment, a width of each of the first lens units in the second direction may gradually increase from the first width to the second width for a first section along the first direction, and gradually decrease from the second width to the first width for a second section which continues from the first section along the first direction, and a width of each of the second lens units in the second direction may gradually decrease from the second width to the first width for the first section, and gradually increase from the first width to the second width for the second section along the first direction.

In an exemplary embodiment, the length of the first section and the length of the second section may be equal, and, for the first and second sections, the cross section of each of the first and second lens units may have the same shape.

In an exemplary embodiment, a cross section of each of the first and second lens units taken along the first plane with respect to the highest point of the convex lens shape of each of the first and second lens units may have a mountain pattern.

In an exemplary embodiment, a height of the mountain pattern of each of the first lens units may gradually increase from a first height to a second height which is greater than the first height for the first section along the first direction, and gradually decrease from the second height to the first height for the second section along the first direction, and a height of the mountain pattern of each of the second lens units may gradually decrease from the second height to the first height for the first section along the first direction, and gradually increase from the first height to the second height for the second section along the first direction.

In an exemplary embodiment, an inclined surface of the mountain pattern of each of the first and second lens units may have a predetermined angle with respect to the first direction, and the angle may be greater than zero degree, and less than or equal to five degrees.

In an exemplary embodiment, both sides of each of the first lens units facing each other in the second direction, and both sides of each of the second lens units facing each other in the second direction may extend with a linear shape in the first section and the second section, and be bent at a boundary of the first section and the second section.

An exemplary embodiment of the invention provides a backlight unit including a light source configured to generate the light and a light guide plate configured to guide the light provided from the light source in an upward direction of where the display panel is disposed. A top surface of the light guide plate includes a plurality of first and second lens patterns configured to extend in a first direction, and each of the first lens patterns and each of second lens patterns are alternately arranged in a second direction crossing the first direction, wherein a height of each of the first lens patterns increases gradually from a first height to a second height which is greater than the first height and then decreases gradually from the second height to the first height repeatedly along the first direction, and a height of each of the second lens patterns is complementary to the height of each of the first lens patterns.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to describe principles of the invention. In the drawings.

DETAILED DESCRIPTION

Figure 1:
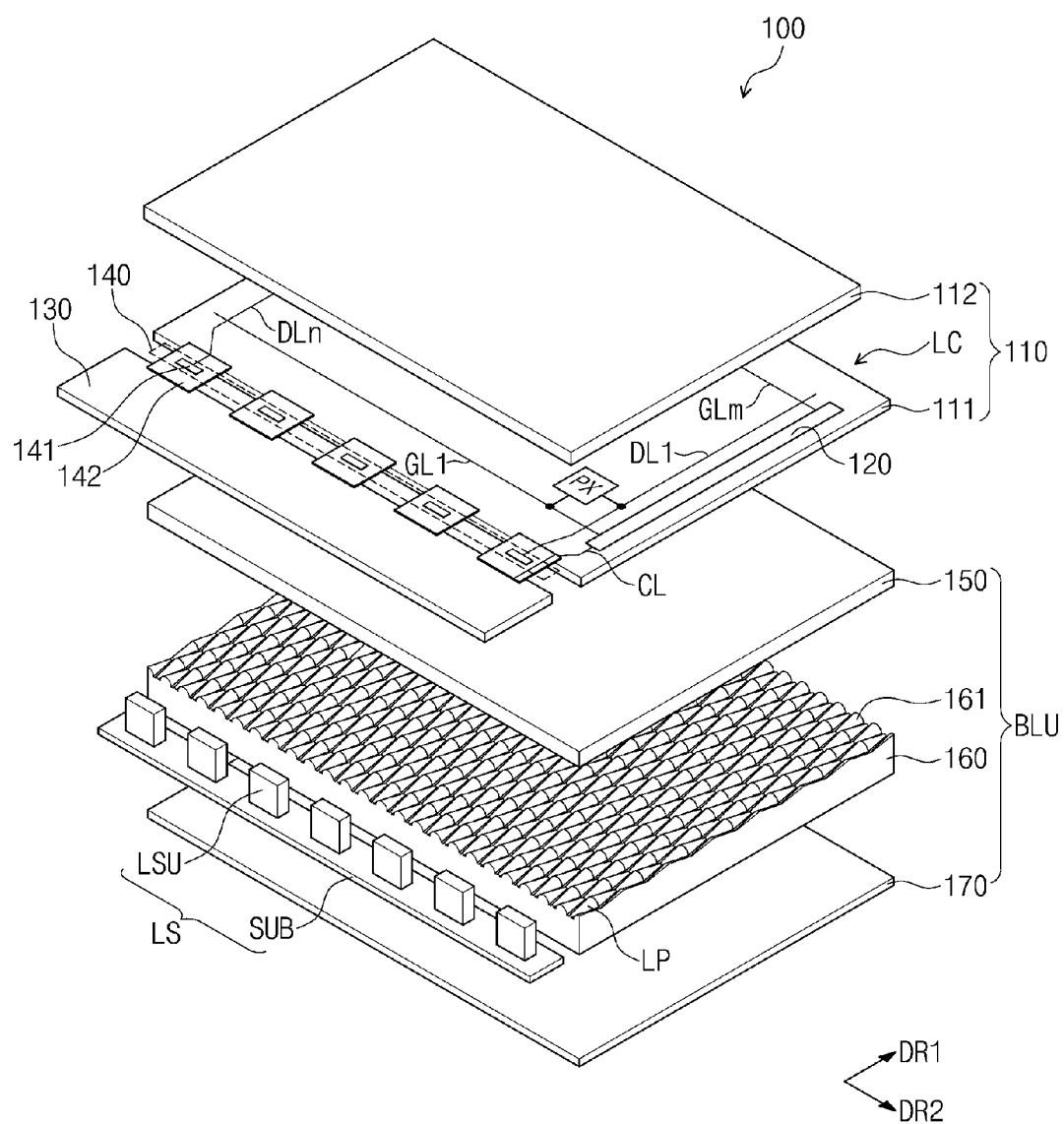
FIG. 1 is an exploded perspective view illustrating an exemplary embodiment of a display apparatus.

Exemplary embodiments of the invention will be described below in more detail with reference to the accompanying drawings to clarify benefit, characteristics, and how to achieve the same. The invention may, however, be embodied in different forms and should not be construed as limited to the exemplary embodiments set forth herein. Rather, these exemplary embodiments are provided such that this disclosure will be thorough and complete, and will fully convey the scope of the invention to those skilled in the art. The scope of the invention is defined by the following claims or the equivalents. Like reference numerals refer to like elements throughout this specification.

It will be understood that when an element or layer is referred to as being "on" another element or layer, it can be directly on the other element or layer, or intervening elements, or layers may be present. On the other hand, it will be understood that when an element or layer is referred to as being "directly on" another element or layer, intervening elements, or layers are not present. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the invention will be described with reference to schematic views such as a plan view and a cross-sectional view. The shape of an exemplary view may be modified by manufacturing techniques, allowable errors, or the like. Thus, exemplary embodiments of the invention are not limited to specific shapes illustrated, but include modifications of shape produced according to manufacturing process. Therefore, the regions illustrated in the figures have schematic attributes, and the shapes of the regions illustrated in the figures are intended to illustrate specific shapes of regions of the elements and are not intended to limit the scope of the invention.

Hereinafter, exemplary embodiments of the invention will be described below in more detail with reference to the accompanying drawings.

FIG. 1 is an exploded perspective view illustrating an exemplary embodiment of a display apparatus.

Referring to FIG. 1, a display apparatus 100 according to an exemplary embodiment of the invention may include a display panel 110, a gate driving unit 120, a printed circuit board 130, a data driving unit 140, and a backlight unit BLU. The display panel 110 may have a short side in a first direction DR1, and a long side in a second direction DR2 crossing the first direction DR1.

The backlight unit BLU generates and collects light to provide to the display panel 110. The display panel 110 displays an image using the light provided from the backlight unit BLU.

The display panel 110 may include a first substrate 111, a second substrate 112 facing the first substrate 111, and a liquid crystal layer LC disposed between the first substrate 111 and the second substrate 112. In the first substrate 111, a plurality of pixels PX, a plurality of gate lines GL1 to GLm, and a plurality of data lines DL1 to DLn may be disposed. "m" and "n" are natural numbers. For ease of description, a single pixel PX is illustrated in FIG. 1. However, actually the plurality of pixels PX rather than a single pixel PX are disposed in the first substrate 111.

The gate lines GL1 to GLm and the data lines DL1 to DLn may be disposed to cross each other but are insulated from each other. The gate lines GL1 to GLm extend in the second direction DR2 to be connected to the gate driving unit 120. The data lines DL1 to DLn extend in the first direction DR1 to be connected to the data driving unit 140.

The pixels PX may be disposed in regions divided by the gate lines GL1 to GLm and the data lines DL1 to DLn crossing the gate lines GL1 to GLm. The pixels PX may be arranged in a matrix form to be connected to the gate lines GL1 to GLm and the data lines DL1 to DLn, respectively.

The gate driving unit 120 may be disposed in a predetermined region of the first substrate 111, adjacent to the short side of the first substrate 111 in the first direction DR1, for example. In an exemplary embodiment, the gate driving unit 120 may be simultaneously provided by the same process as that for transistors of the pixels PX such that the gate driving unit 120 and the transistors of the pixels PX may be mounted on the first substrate 111 in the form of amorphous silicon TFT gate driver circuit ("ASG"), or oxide silicon TFT gate driver circuit ("OSG"), for example.

However, the gate driving unit 120 is not limited thereto, and may include a plurality of driving chips, and mounted on a flexible printed circuit board to be connected to the first substrate 111 by a tape carrier package ("TCP") technique, for example. In another exemplary embodiment, the gate driving unit 120 may include a plurality of driving chips to be mounted on the first substrate 111 by a chip on glass ("COG") technique, for example.

A timing controller (not illustrated) may be disposed on the printed circuit board 130. The timing controller may be mounted on the printed circuit board 130 in the form of an integrated circuit chip to be connected to the gate driving unit 120 and the data driving unit 140. The timing controller may output a gate control signal, a data control signal, and image data.

The gate driving unit 120 may receive the gate control signal from the timing controller through a control line CL. The gate driving unit 120 may generate a plurality of gate signals in response to the gate control signal, and sequentially output the generated gate signals. The gate signals may be provided to the pixels PX arranged in rows through the gate lines GL1 to GLm. As a result, the pixels PX may be driven on a row-by-row basis.

The data driving unit 140 may include a plurality of source driving chips 141. The source driving chips 141 may be mounted on flexible printed circuit boards 142 to be connected to a predetermined region on the printed circuit board 130 and on the long side of the first substrate 111 in the second direction DR2. That is, the data driving unit 140 may be connected to the first substrate 111 and the printed circuit board 130 by the TCP technique, for example. However, the source driving chips 141 of the data driving unit 140 are not limited thereto, and may be mounted on the first substrate 111 by the COG technique.

The data driving unit 140 may receive the image data and the data control signal from the timing controller. The data driving unit 140 may generate and output data voltages in an analog form corresponding to the image data in response to the data control signal. The data voltages may be provided to the pixels PX through the data lines DL1 to DLn.

The pixels PX receive the data voltages through the data lines DL1 to DLn in response to the gate signals provided through the gate lines GL1 to GLm respectively. An image may be displayed by the pixels PX displaying gradations corresponding to the data voltages.

The backlight unit BLU may be an edge type backlight unit. The backlight unit BLU may include an optical member 150, a light guide plate 160, a light source LS, and a reflective sheet 170. The optical member 150, the light guide plate 160, and the reflective sheet 170 may be rectangular plates which have a short side in the first direction DR1 and a long side in the second direction DR2.

The optical member 150 may be disposed beneath the display panel 110, the light guide plate 160 is disposed beneath the optical member 150, and the reflective sheet 170 is disposed beneath the light guide plate 160. In an exemplary embodiment, the light source LS may extend in the second direction DR2, and be disposed to be adjacent to either of both sides of the light guide plate 160, facing each other in the first direction DR1, for example.

The light guide plate 160 may include glass, but is not limited thereto. In another exemplary embodiment, the light guide plate 160 may include a plastic material such as polymethylmethacrylate ("PMMA"). One side of the light guide plate 160, disposed adjacent to the light source LS, may be defined as a light incident surface. The light generated at the light source LS may be provided to the light incident surface of the light guide plate 160. The light guide plate 160 guides the light provided from the light source LS in an upward direction toward the display panel 110 disposed thereabove.

A top surface 161 of the light guide plate 160 includes a plurality of lens patterns LP which extend in the first direction DR1 and are arranged in the second direction DR2. The light which has reached the light guide plate 160 from the light source LS may be collected and emitted by the lens patterns LP. Light emission efficiency of the light which has reached the light guide plate 160 from the light source LS may be improved by the lens patterns LP. A detailed description of the lens patterns LP will be given later.

The light source LS may include a light source substrate SUB extending in the second direction DR2 and a plurality of light source units LSU mounted on the light source substrate SUB. The light source units LSU may be arranged at regular intervals in the second direction DR2. The light source units LSU may be disposed to face the one side of the light guide plate 160, which is the light incident surface. The light source units LSU generate light, and the light generated by the light source units LSU is provided to the one side of the light guide plate 160, which is the light incident surface.

The reflective sheet 170 may reflect light proceeding to the bottom surface of the light guide plate 160 in the upward direction of where the display panel 110 is disposed. The optical sheet 150 may include a diffusion sheet (not illustrated) and a prism sheet (not illustrated) disposed above the diffusion sheet. The diffusion sheet may diffuse the light provided from the light guide plate 160.

Hereinafter, for ease of description, a base plane is defined as a plane defined by the first and second directions DR1 and DR2, a first plane is defined as a plane perpendicular to the second direction DR2, and a second plane is defined as a plane perpendicular to the first direction DR1.

The prism sheet may refract the light diffused at the diffusion sheet in the upward direction perpendicular to the base plane. Though not illustrated, the prism sheet may include a plurality of prism patterns which extend in the second direction DR2 and are arranged in the first direction DR1. A cross section of each of the prism patterns taken along the first plane, have an inverted triangular shape. The light which has passed through the prism sheet may travel in the upward direction to be provided to the display panel 110 with a uniform luminance distribution. The display panel 110 may display an image using the light provided from the optical sheet 150.

Figure 2:
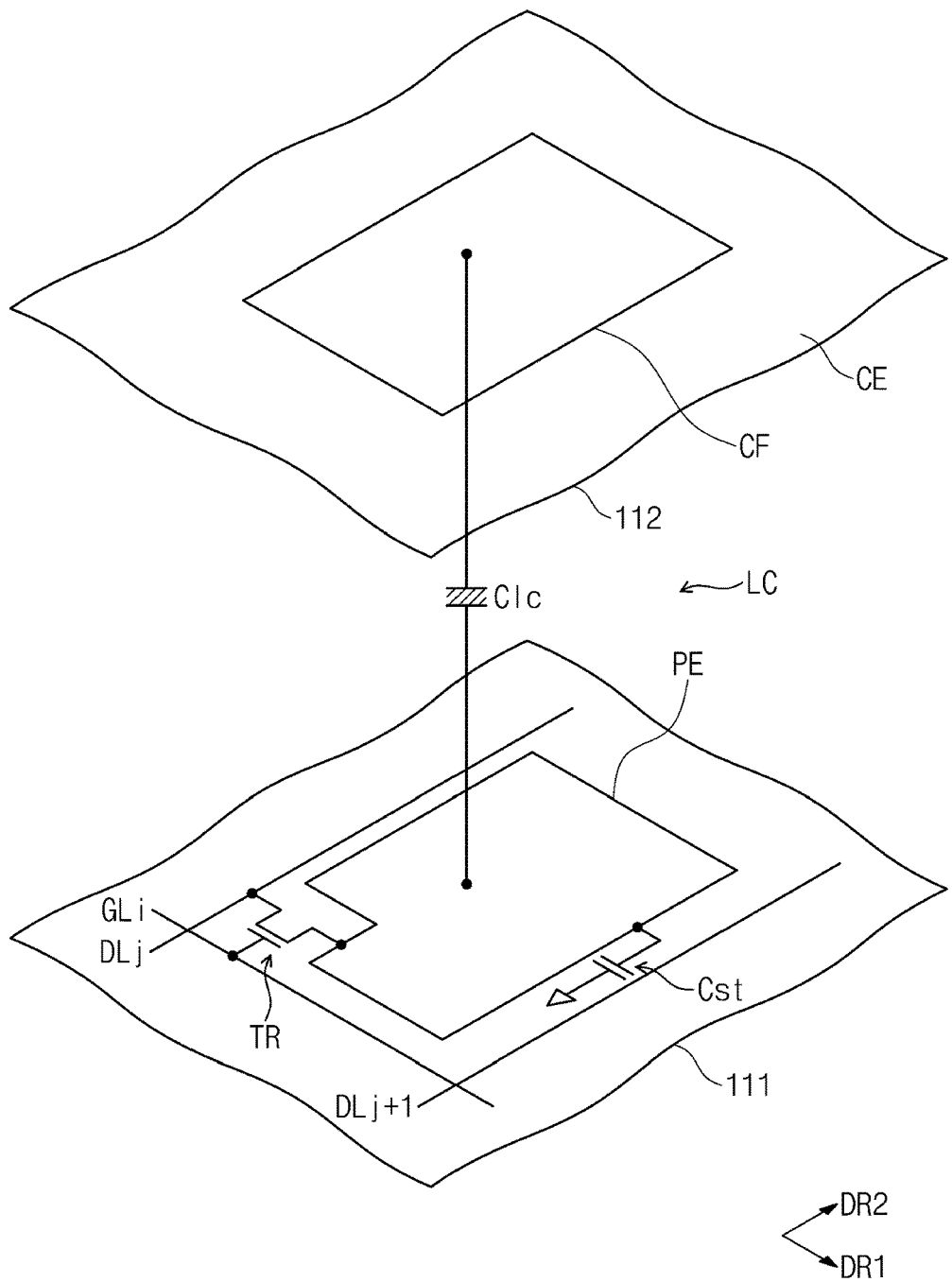
FIG. 2 illustrates an exemplary embodiment of a pixel configuration illustrated in FIG. 1.

FIG. 2 illustrates an exemplary embodiment of a pixel configuration illustrated in FIG. 1.

For ease of description, an exemplary embodiment of a pixel PX connected to a gate line GLi and a data line DLj is illustrated in FIG. 2. Though not illustrated, a configuration of other pixels PX of the display panel 110 may be the same as that of the pixel PX illustrated in FIG. 2.

Referring to FIG. 2, the pixel PX may include a transistor TR connected to the gate line GLi and the data line DLj, a liquid crystal capacitor Clc connected to the transistor TR, and a storage capacitor Cst connected in parallel to the liquid crystal capacitor Clc. The storage capacitor Cst may be omitted. "i" and "j" are natural numbers.

The transistor TR may be disposed in the first substrate 111. The transistor TR may include a gate electrode connected to the gate line GLi, a source electrode connected to the data line DLj, and a drain electrode connected to the liquid crystal capacitor Clc and the storage capacitor Cst.

The liquid crystal capacitor Clc may include a pixel electrode PE disposed in the first substrate 111, a common electrode CE disposed in the second substrate 112, and the liquid crystal layer LC disposed between the pixel electrode PE and the common electrode CE. The liquid crystal layer LC functions as a dielectric. The pixel electrode PE is connected to the drain electrode of the transistor TR. The pixel electrode PE and the transistor TR are disposed between the data line DLj and a data line DLj+1.

In FIG. 2, the pixel electrode PE has a non-slit structure, but the structure of the pixel electrode PE is not limited thereto. In another exemplary embodiment, the pixel electrode PE may have a slit structure including a cross-shaped base line and a plurality of branches extending radially from the base line.

The common electrode CE may be disposed entirely on the second substrate 112. However, the disposition of common electrode CE is not limited thereto. The common electrode CE may be disposed in the first substrate 111. In this case, at least one of the pixel electrode PE and the common electrode CE may include a slit.

The storage capacitor Cst may include the pixel electrode PE, a storage electrode (not illustrated) diverging from a storage line (not illustrated), and an insulation layer disposed between the pixel electrode PE and the storage electrode. The storage line may be disposed in the first substrate 111, and be simultaneously disposed in the same layer as the gate lines GL1 to GLm. The storage electrode may partly overlap the pixel electrode PE.

In an exemplary embodiment, the pixel PX may further include a color filter CF having one of red, green, and blue colors, for example. As an exemplary embodiment, the color filter CF may be disposed in the second substrate 112 as illustrated in FIG. 2. However, the disposition of the color filter CF is not limited thereto. In another exemplary embodiment, the color filter CF may be disposed in the first substrate 111.

The transistor TR may be turned on in response to a gate signal provided through the gate line GLi. A data voltage received through the data line DLj is provided to the pixel electrode PE of the liquid crystal capacitor Clc through the turned-on transistor TR. A common voltage is applied to the common electrode CE.

An electric field may be generated between the pixel electrode PE and the common electrode CE by a voltage level difference between the data voltage and the common voltage. An arrangement of liquid crystal molecules of the liquid crystal layer LC may be driven by the electric field generated between the pixel electrode PE and the common electrode CE. Transmittance of light through the liquid crystal layer LC may be adjusted by the liquid crystal molecules driven by the electric field to display an image.

A storage voltage with a constant voltage level may be applied to the storage line. However, the voltage applied to the storage line is not limited thereto. In another exemplary embodiment, the common voltage may be applied to the storage line, for example. The storage capacitor Cst may function to complement a voltage charged in the liquid crystal capacitor Clc.

Figure 3:
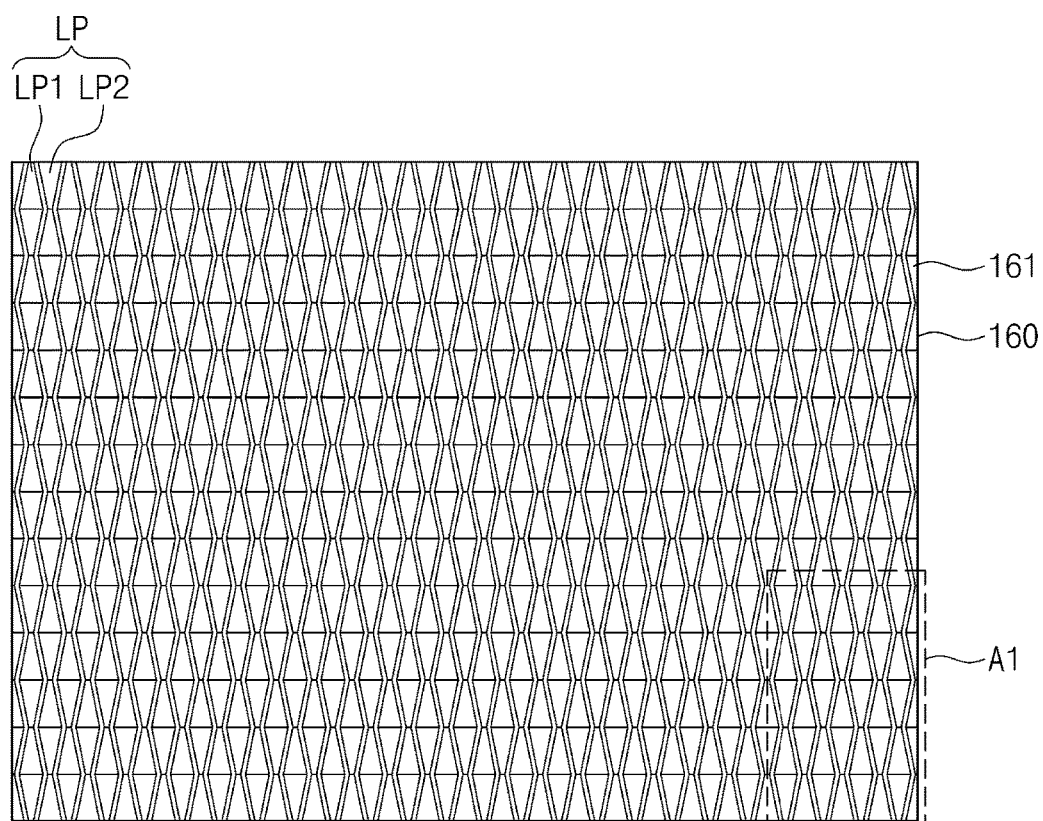
FIG. 3 is a plan view illustrating an exemplary embodiment of a light guide plate as seen from the top of the light guide plate illustrated in FIG. 1.
Figure 4:
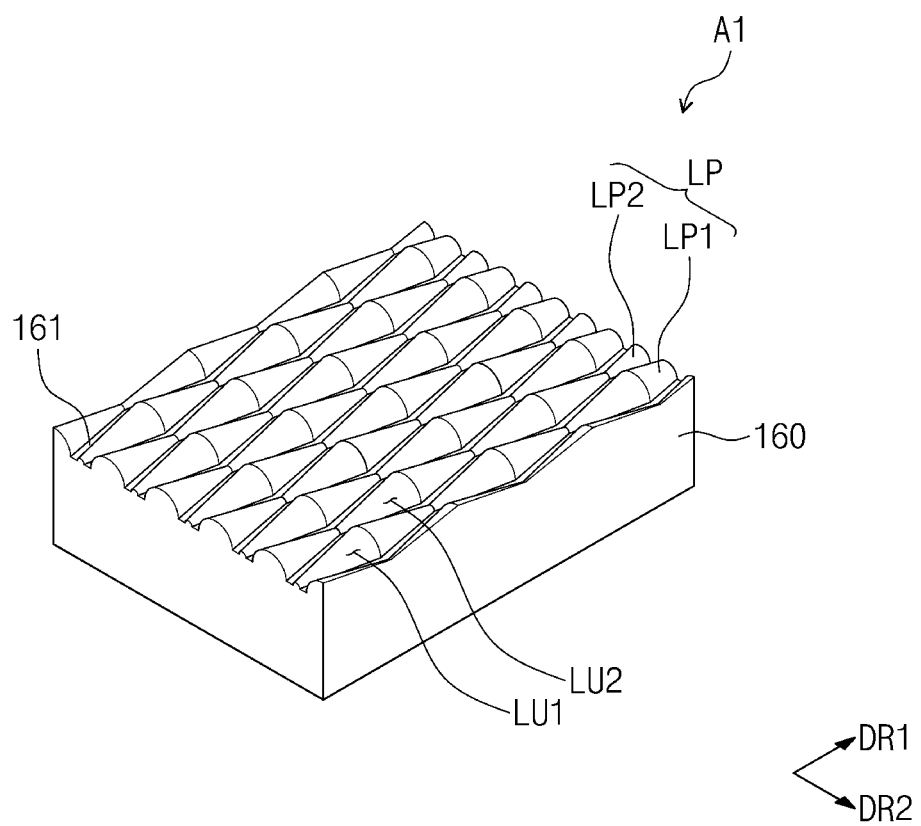
FIG. 4 is an enlarged perspective view illustrating an exemplary embodiment of the area 'A1' illustrated in FIG. 3.
Figure 5:
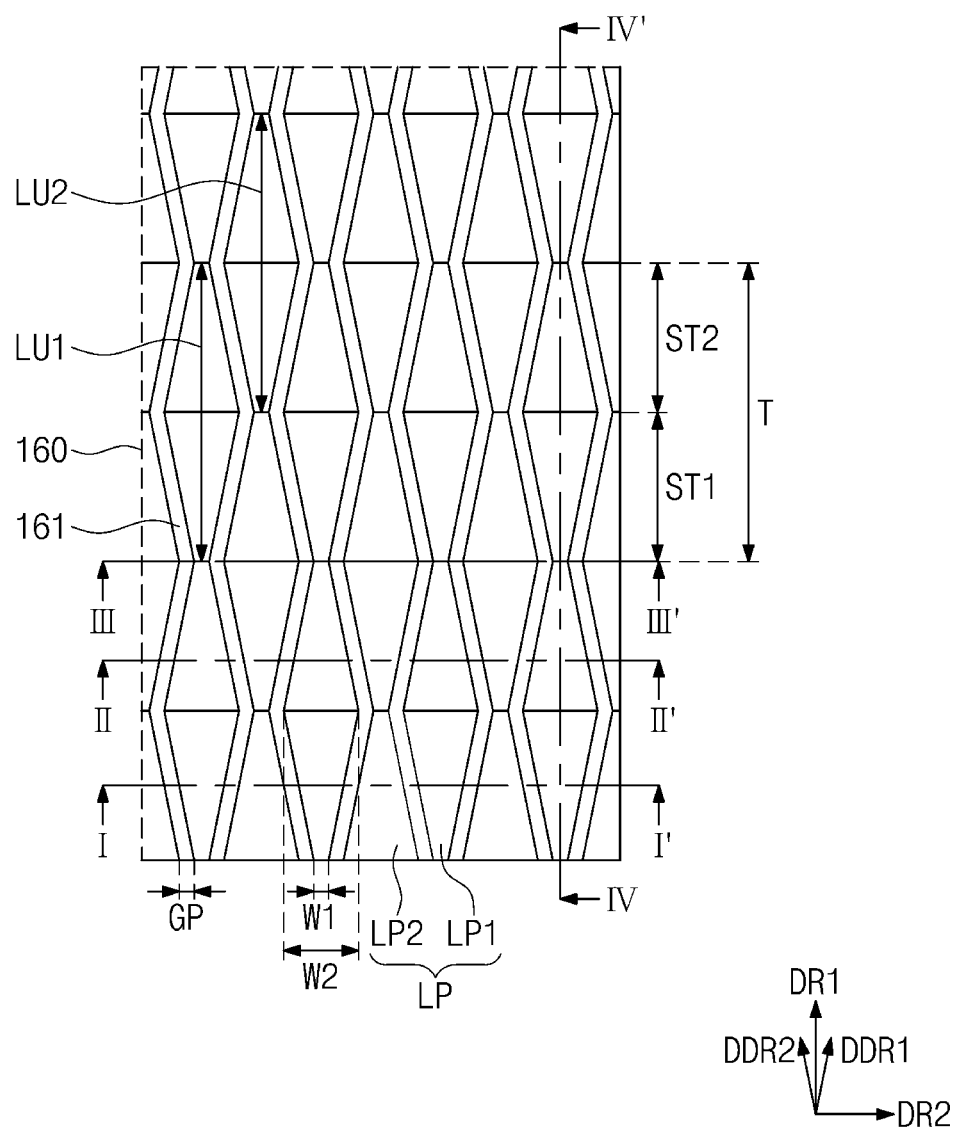
FIG. 5 is a plan view illustrating an exemplary embodiment of the area 'A1' as seen from the top of the area 'A1' illustrated in FIG. 4.

FIG. 3 is a plan view illustrating an exemplary embodiment of a light guide plate as seen from the top of the light guide plate illustrated in FIG. 1. FIG. 4 is an enlarged perspective view illustrating an exemplary embodiment of the area 'A1' illustrated in FIG. 3. FIG. 5 is a plan view illustrating an exemplary embodiment of the area 'A1' as seen from the top of the area 'A1' illustrated in FIG. 4.

Referring to FIG. 3, in an exemplary embodiment, the light source units LSU may be disposed to be adjacent to either of both sides of the light guide plate 160 facing each other in the first direction DR1. The lens patterns LP include a plurality of first lens patterns LP1 and a plurality of second lens patterns LP2 which extend in the first direction DR1 and are arranged in the second direction DR2. The first lens patterns LP1 and the second lens patterns LP2 may be alternately arranged with one-to-one correspondence.

Hereinafter, a width of each of the first lens patterns LP1 is defined as a distance between both sides of each of the first lens patterns LP1 facing each other in the second direction DR2, and a width of each of the second lens patterns LP2 is defined as a distance between both sides of each of the second lens patterns LP2 facing each other in the second direction DR2. The first lens patterns LP1 and the second lens patterns LP2 may have the same shape, and be disposed complementarily to each other.

The width of each of the first lens patterns LP1 repeatedly increases gradually, and then gradually decreases along the first direction DR1. The width of each of the second lens patterns LP2 repeatedly increases gradually, and then gradually decreases. Because the first lens patterns LP1 and the second lens patterns LP2 are disposed complementarily to each other, widths of the second lens patterns LP2 decrease gradually as widths of the first lens patterns LP1 increase gradually, and the widths of the second lens patterns LP2 increase gradually as the widths of the first lens patterns LP1 decrease gradually.

Referring to FIGS. 4 and 5, the first and second lens patterns LP1 and LP2 may be disposed to be spaced apart from each other at a predetermined interval GP in the second direction DR2. In an exemplary embodiment, the interval GP between two of a first lens pattern LP1 and a second lens pattern LP2 adjacent to each other may be from about 5 micrometers (μm) to about 10 μm.

The width of each of the first lens patterns LP1 increases gradually from a first width W1 to a second width W2 which is greater than the first width W1, and decreases gradually from the second width W2 to the first width W1 repeatedly. The width of each of the second lens patterns LP2 is complementary to the width of each of the first lens patterns LP1.

In an exemplary embodiment, for example, when the width of each of the first lens patterns LP1 increases gradually from the first width W1 to the second width W2, the width of each of the second lens patterns LP2 decreases gradually from the second width W2 to the first width W1. When the width of each of the first lens patterns LP1 decreases gradually from the second width W2 to the first width W1, the width of each of the second lens patterns LP2 increases gradually from the first width W1 to the second width W2. That is, a complementary relationship between the first and second width W1 and W2.

Each of the first lens patterns LP1 includes a plurality of first lens units LU1 arranged in the first direction DR1 and coupled to each other, and each of the second lens patterns LP2 includes a plurality of second lens units LU2 arranged in the first direction DR1 and coupled to each other. The first lens units LU1 and the second lens units LU2 have widths complementary to each other, and are disposed complementarily to each other.

Hereinafter, a width of each of the first lens units LU1 is defined as a distance between both sides of each of the first lens units LU1 facing each other in the second direction DR2, and a width of each of the second lens units LU2 is defined as a distance between both sides of each of the second lens units LU2 facing each other in the second direction DR2.

The width of each of the first lens units LU1 gradually increases from the first width W1 to the second width W2 for a first section ST1, and gradually decreases from the second width W2 to the first width W1 for a second section ST2 which starts from the end of the first section ST1 as a measuring point of the width moves in the first direction DR1. Here, the first section ST1 and the second section ST2 are a spatial concept rather than a temporal concept. A sum of the first section ST1 and the second section ST2 is equal to the length of each of the first lens units LU1 and equal to the length of each of the second lens units LU2.

As illustrated in FIG. 5, in an exemplary embodiment, the first section ST1 and the second section ST2 are set to the same value. However, the relationship between the lengths of the first and second sections ST1 and ST2 is not limited thereto. In another exemplary embodiment, the first section ST1 and the second section ST2 may be set to values different from each other.

Because the width of each of the second lens units LU2 is complementary to the width of each of the first lens units LU1, the width of each of the second lens units LU2 gradually decreases from the second width W2 to the first width W1 for the first section ST1, and gradually increases from the first width W1 to the second width W2 for the second section ST2, in the first direction DR1.

The first width W1 may be defined as a minimum width of each of the first and second lens units LU1 and LU2, and the second width W2 may be defined as a maximum width of each of the first and second lens units LU1 and LU2.

The sum of the first section ST1 and the second section ST2 corresponds to the period T of each of the first lens patterns LP1 and the period T of each of the second lens patterns LP2. That is, in an exemplary embodiment, the first section ST1 corresponds to a half section of the period T of each of the first and second lens patterns LP1 and LP2, and the second section ST2 corresponds to a remaining half section of the period T of each of the first and second lens patterns LP1 and LP2, for example.

Hereinafter, a first diagonal direction DDR1 is defined as a direction intersecting the first direction DR1 and the second direction DR2 on the base plane, and a second diagonal direction DDR2 is defined as another direction intersecting the first direction DR1 and the second direction DR2 on the base plane, and the second diagonal direction DDR2 and the first diagonal direction DDR1 are symmetric with respect to the first direction DR1. The both sides of each of the first lens units LU1 and the both sides of each of the second lens units LU2 are defined respectively as the both sides of each of the first lens units LU1 and the both sides of each of the second lens units LU2 facing each other in the second direction DR2.

The both sides of each of the first and second lens units LU1 and LU2 extend with a linear shape in the first section ST1 and the second section ST2, and are bent at a boundary where the first section ST1 and the second section ST2 are connected.

In an exemplary embodiment, for example, the both sides, from left to right as illustrated in FIG. 5, of each of the first lens units LU1 respectively extend in the first diagonal direction DDR1 and the second diagonal direction DDR2 for the first section ST1. For the second section ST2, one side, which has extended in the first diagonal direction DDR1 for the first section ST1, extends in the second diagonal direction DDR2, and the other side, which has extended in the second diagonal direction DDR2 for the first section ST1, extends in the first diagonal direction DDR1.

Because the second lens units LU2 are disposed complementarily to the first lens units LU1, the both sides, from left to right, of each of the second lens units LU2 respectively extend in the second diagonal direction DDR2 and the first diagonal direction DDR1 for the first section ST1. For the second section ST2, one side, which has extended in the second diagonal direction DDR2 for the first section ST1, extends in the first diagonal direction DDR1, and the other side, which has extended in the first diagonal direction DDR1 for the first section ST1, extends in the second diagonal direction DDR2.

Figure 6:
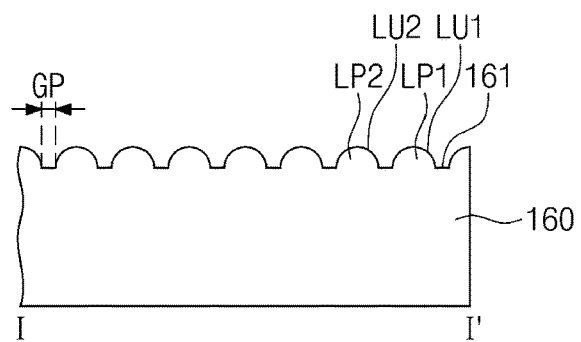
FIG. 6 is a cross-sectional view taken along line I-I' of FIG. 5.
Figure 6:
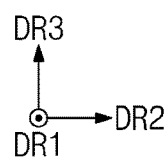
Figure 7:
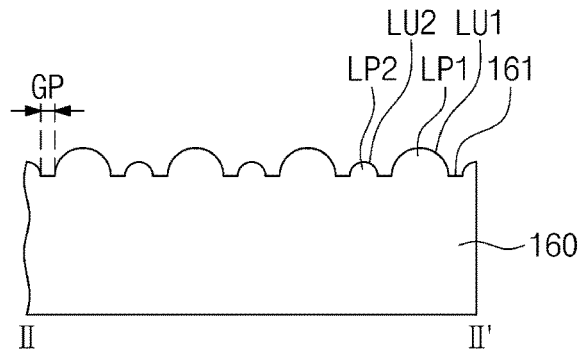
FIG. 7 is a cross-sectional view taken along line II-II' of FIG. 5.
Figure 7:
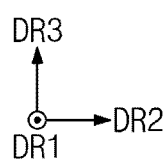
Figure 8:
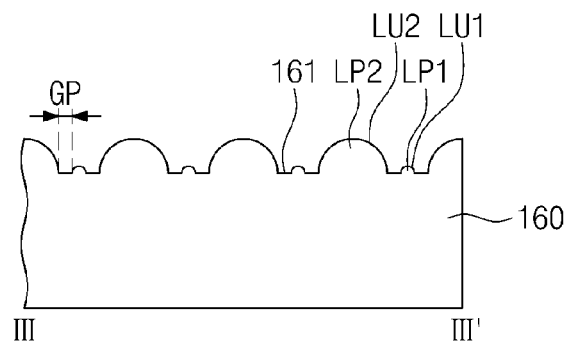
FIG. 8 is a cross-sectional view taken along line III-III' of FIG. 5.
Figure 8:
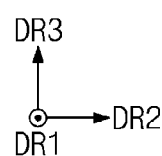
Figure 9:
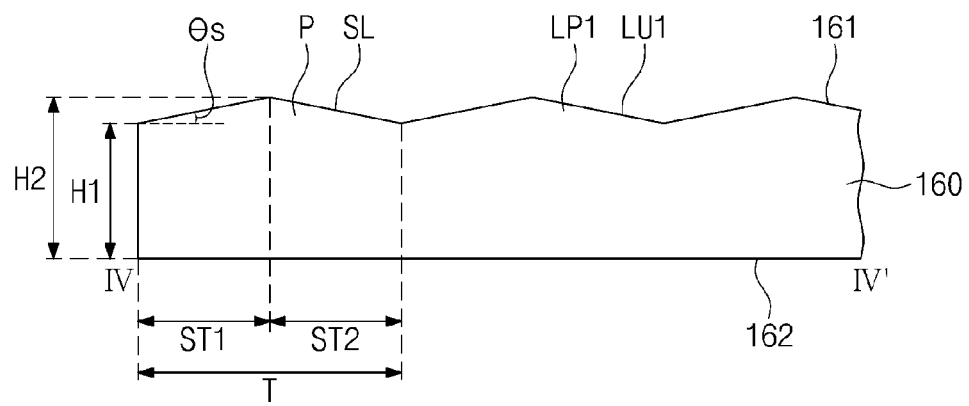
FIG. 9 is a cross-sectional view taken along line IV-IV' of FIG. 5.
Figure 9:
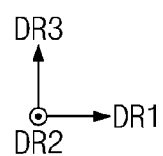

FIG. 6 is a cross-sectional view taken along line I-I' of FIG. 5. FIG. 7 is a cross-sectional view taken along line II-II' of FIG. 5. FIG. 8 is a cross-sectional view taken along line III-III' of FIG. 5. FIG. 9 is a cross-sectional view taken along line IV-IV' of FIG. 5.

Referring to FIGS. 6 to 9, in an exemplary embodiment, a cross section of each of the first and second lens units LU1 and LU2 taken along the second plane may have a convex lens shape convexly protruding in the upward direction, for example. The upward direction may be defined as a third direction DR3 which intersects the base plane defined by the first direction DR1 and the second direction DR2, and points toward the top of the light guide plate.

As illustrated in FIGS. 6 to 8, depending on a position where the cross section is taken, a cross section size of each of the first lens units LU1 and a cross section size of each of the second lens units LU2 may be equal, the cross section size of each of the first lens units LU1 may be greater than the cross section size of each of the second lens units LU2, or the cross section size of each of the first lens units LU1 may be less than the cross section size of each of the second lens units LU2. However, a curvature of each of the first and second lens units LU1 and LU2 may remain the same for the first and second sections ST1 and ST2.

As illustrated in FIG. 9, a cross section of each of the first lens patterns LP1 taken along the line IV-IV' has a plurality of mountain patterns P protruding in the third direction DR3. Because the second lens patterns LP2 have the same shape as the first lens patterns LP1, a cross section of each of the second lens patterns LP2 taken along the line IV-IV' has also a plurality of mountain patterns protruding in the third direction DR3.

Each of the first and second lens units LU1 and LU2 may form one mountain pattern P. In an exemplary embodiment, for example, a cross section of each of the first and second lens units LU1 and LU2 taken along the line IV-IV' which crosses the highest point of the convex lens shape of each of the first and second lens units LU1 and LU2 has the mountain pattern P.

As illustrated in FIG. 9, a height of the mountain pattern P of each of the first lens units LU1 gradually may increase from a first height H1 to a second height H2 which is greater than the first height H1 for the first section ST1, and gradually decrease from the second height H2 to the first height H1 for the second section ST2 as the measuring point of the height moves in the first direction DR1. The first height H1 is defined as a distance between a bottom surface 162 of the light guide plate 160 and the top surface 161 of the light guide plate 160 at a position where the first width W1 is measured. The second height H2 is defined as a distance between the bottom surface 162 of the light guide plate 160 and the top surface 161 of the light guide plate 160 at a position where the second width W2 is measured.

Though not illustrated in FIG. 9, a height of the mountain pattern P of each of the second lens units LU2 disposed complementarily to the first lens units LU1 may gradually decrease from the second height H2 to the first height H1 for the first section ST1, and may gradually increase from the first height H1 to the second height H2 for the second section ST2 as the measuring point of the height moves in the first direction DR1.

The width of each of the first lens units LU1 may gradually increase for the first section ST1, and gradually decrease for the second section ST2 such that each of the first lens units LU1 has the mountain pattern P, and the convex lens shape of each of the first lens units LU1 maintains the same curvature for the first and second sections ST1 and ST2.

As the width of each of the second lens units LU2 may also gradually decrease for the first section ST1, and gradually increase for the second section ST2 such that the convex lens shape of each of the second lens units LU2 may have the same curvature for the first and second sections ST1 and ST2.

An inclined surface SL of the mountain pattern P of each of the first lens units LU1 may form a predetermined angle $\theta s$ with respect to the first direction DR1. In an exemplary embodiment of the invention, the angle which the inclined surface SL of the mountain pattern P of each of the first lens units LU1 has with respect to the first direction DR1 may be greater than zero degree, and less than or equal to five degrees, for example.

Figure 10:
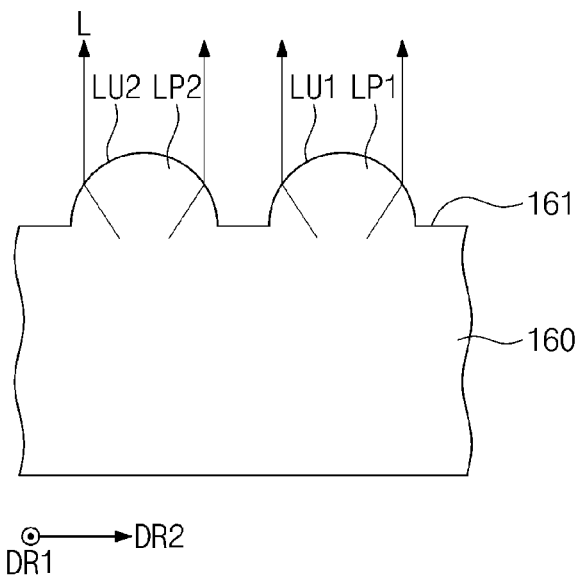
FIG. 10 illustrates an exemplary embodiment of refraction of light at first and second lens units of a top surface of the light guide plate.
Figure 11:
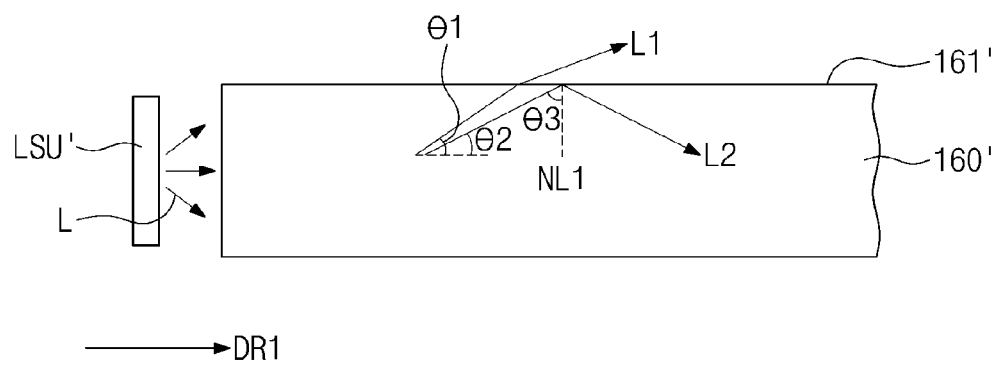
FIG. 11 illustrates an exemplary embodiment of the refraction of light in the case that the top surface of the light guide plate is flat with respect to a first direction.
Figure 12:
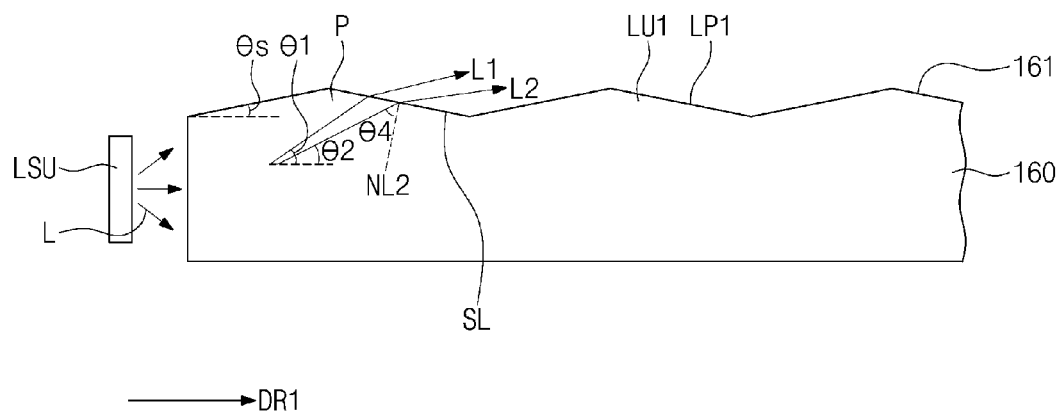
FIG. 12 illustrates an exemplary embodiment of the refraction of light at a mountain pattern of the top surface of the light guide plate.

FIG. 10 illustrates an exemplary embodiment of refraction of light at first and second lens units of a top surface of the light guide plate. FIG. 11 illustrates an exemplary embodiment of the refraction of light in the case that the top surface of the light guide plate is flat with respect to the first direction. FIG. 12 illustrates an exemplary embodiment of the refraction of light at mountain patterns of the top surface of the light guide plate.

For ease of description, one of the first lens units LU1 and one of the second lens units LU2 in the cross sectional view of FIG. 6 are enlargedly illustrated in FIG. 10. The mountain patterns P of the first lens units LU1 are illustrated in FIG. 12.

Referring to FIG. 10, light L generated in the light source LS is provided to the light guide plate 160, and the light L guided in the light guide plate 160 is emitted through the top surface 161 of the light guide plate 160. The light guide plate 160 may receive the light L generated in the light source LS through either of both sides of the light guide plate 160 facing each other in the first direction DR1. The first and second lens units LU1 and LU2 may have a convex lens shape with the same curvature. The light L may be refracted by the first lens units LU1 or the second LU2 having the convex lens shape, and then collected to be emitted in the upward direction. The a convex lens shape of the first and second lens units LU1 and LU2 may refract mainly the component of the light L in the second direction DR2 or a direction reverse thereto. As a result, light collecting efficiency may be improved.

Referring to FIG. 11, light L generated in a light source unit LSU' may be provided to a light guide plate 160', and first light L1 traveling at a first angle $\theta 1$ with respect to the first direction DR1, and second light L2 traveling at a second angle $\theta 2$ with respect to the first direction DR1, among the light L, may be provided to a top surface 161' of the light guide plate 160'. The top surface 161' of the light guide plate 160' may be parallel to the first direction DR1, and the first angle $\theta 1$ is larger than the second angle $\theta 2$.

In FIG. 11, an angle of incidence of a light L to a surface is defined as an angle between a first normal line NL1 perpendicular to the surface, e.g., the top surface 161' of the light guide plate 160', and a direction in which the light L travels. Accordingly, the angle of incidence of the second light L2 traveling at the second angle $\theta 2$ is larger than the angle of incidence of the first light L1 traveling at the first angle $\theta 1$.

Total internal reflection phenomenon is defined as a phenomenon that light is totally reflected at the boundary of a medium in the case that an angle of incidence is greater than a critical angle and the light travels from a medium with a larger refractive index to a medium with a smaller refractive index.

In FIG. 11, the angle of incidence of the first light L1 traveling at the first angle θ1 may be smaller than the critical angle for total internal reflection in the light guide plate 160'. Therefore, the first light L1 traveling at the first angle θ1 may penetrate the top surface 161' of the light guide plate 160' to be emitted to the outside of the light guide plate 160'. However, a third angle θ3 defined as the angle of incidence of the second light L2 traveling at the second angle θ2 may be larger than the critical angle for total internal reflection on the top surface 161. Therefore, the second light L2 traveling at the second angle θ2 may be reflected from the top surface 161' of the light guide plate 160' not to be emitted to the outside of the light guide plate 160'. Accordingly, the light emission efficiency of light may be decreased.

Referring to FIG. 12, light L generated in the light source unit LSU' may be provided to the light guide plate 160, and first light L1 traveling at a first angle θ1, and second light L2 traveling at a second angle θ2 may be provided to the top surface 161 of the light guide plate 160.

In FIG. 12, the angles of incidence of the first light L1 and the second light L2 are respectively the angle between a second normal line NL2 perpendicular to the inclined surface SL of the top surface 161 of the light guide plate 160 and a direction in which the first light L1 travels, and the angle between the second normal line NL2 and a direction in which the second light L2 travels. The angle of incidence of the second light L2 traveling at the second angle θ2 is larger than the angle of incidence of the first light L1 traveling at the first angle θ1.

In FIG. 12, the angle of incidence of the first light L1 traveling at the first angle θ1 may be smaller than the critical angle for total internal reflection on the inclined surface SL, and the first light L1 traveling at the first angle θ1 may penetrate the inclined surface SL of the light guide plate 160 to be emitted to the outside of the light guide plate 160. Because of the inclined surface SL, a fourth angle θ4 defined as the angle of incidence of the second light L2 traveling at the second angle θ2 on the inclined surface SL may be smaller than the third angle θ3, and smaller than the critical angle. Accordingly, the second light L2 with the angle of incidence of the fourth angle θ4 may penetrate the inclined surface SL of the light guide plate 160. That is, the second light L2 traveling at the second angle θ2 may penetrate the inclined surface SL of the light guide plate 160 while the same light traveling with the same angle θ2 may not penetrate the top surface 161' of the light guide plate 160'. The inclined surface SL of the light guide plate 160 may refract mainly the component of the light L in the first direction DR1. Accordingly, the light emission efficiency may be improved in the exemplary embodiment of FIG. 12.

As a result, the backlight unit BLU, and the display apparatus 100 including the backlight unit BLU according to an exemplary embodiment of the invention may collect the light L and improve the light emission efficiency by the plurality of lens patterns LP which maintain a predetermined curvature and have the mountain patterns P.

Figure 13:
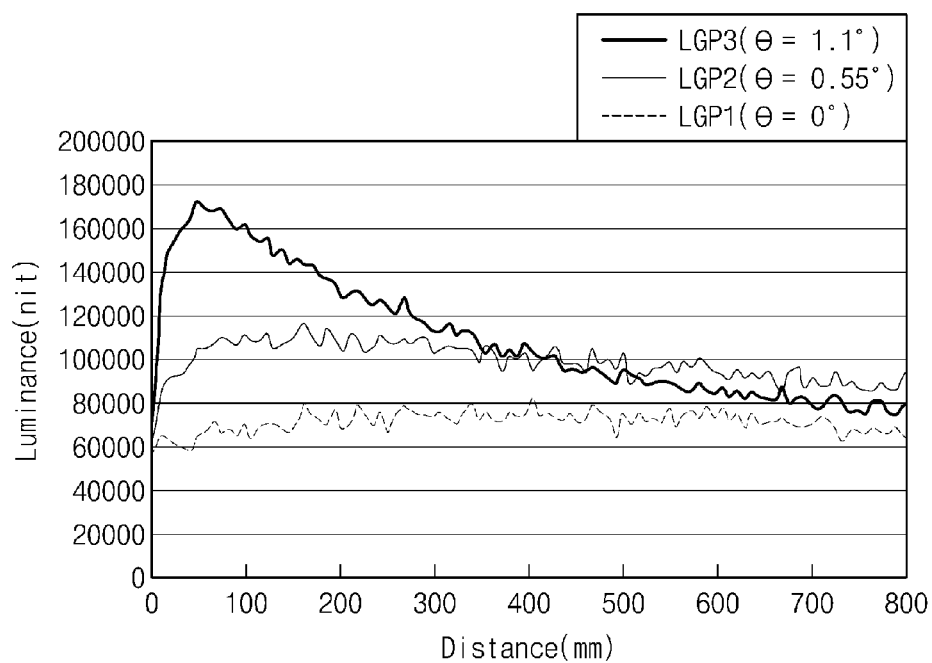
FIG. 13 is a graph showing luminance of light emitted from the light guide plate (nit) versus distance from a side of the light guide plate where the light is provided to the light guide plate (millimeters: mm) in exemplary embodiments of light guide plates.

FIG. 13 is a graph showing luminance of light emitted from the light guide plate (nit) versus distance from a side of the light guide plate where the light is provided to the light guide plate (millimeters: mm) in exemplary embodiments of light guide plates.

Exemplary embodiments of three light guide plates are compared in FIG. 13. For a first light guide plate LGP1, an angle of inclination of the inclined surface SL is zero degree, and a top surface of the first light guide plate LGP1 is substantially parallel to the first direction DR1. The inclined surface SL of a second light guide plate LGP2 has an angle of 0.55 degrees with respect to the first direction DR1, and the inclined surface SL of a third light guide plate LGP3 has an angle of 1.1 degrees with respect to the first direction DR1. The length of each of the light guide plates LGP1, LGP2 and LGP3 in the first direction DR1 is 800 mm, and the unit of luminance is nit.

Referring to FIG. 13, luminance of the second and third light guide plates LGP2 and LGP3 is higher than that of the first light guide plate LGP1 in the same distance. In other words, the second and third light guide plates LGP2 and LGP3 with inclined surfaces having predetermined angles with respect to the first direction DR1 may have higher light emission efficiency than that of first light guide plate LGP1.

Figure 14:
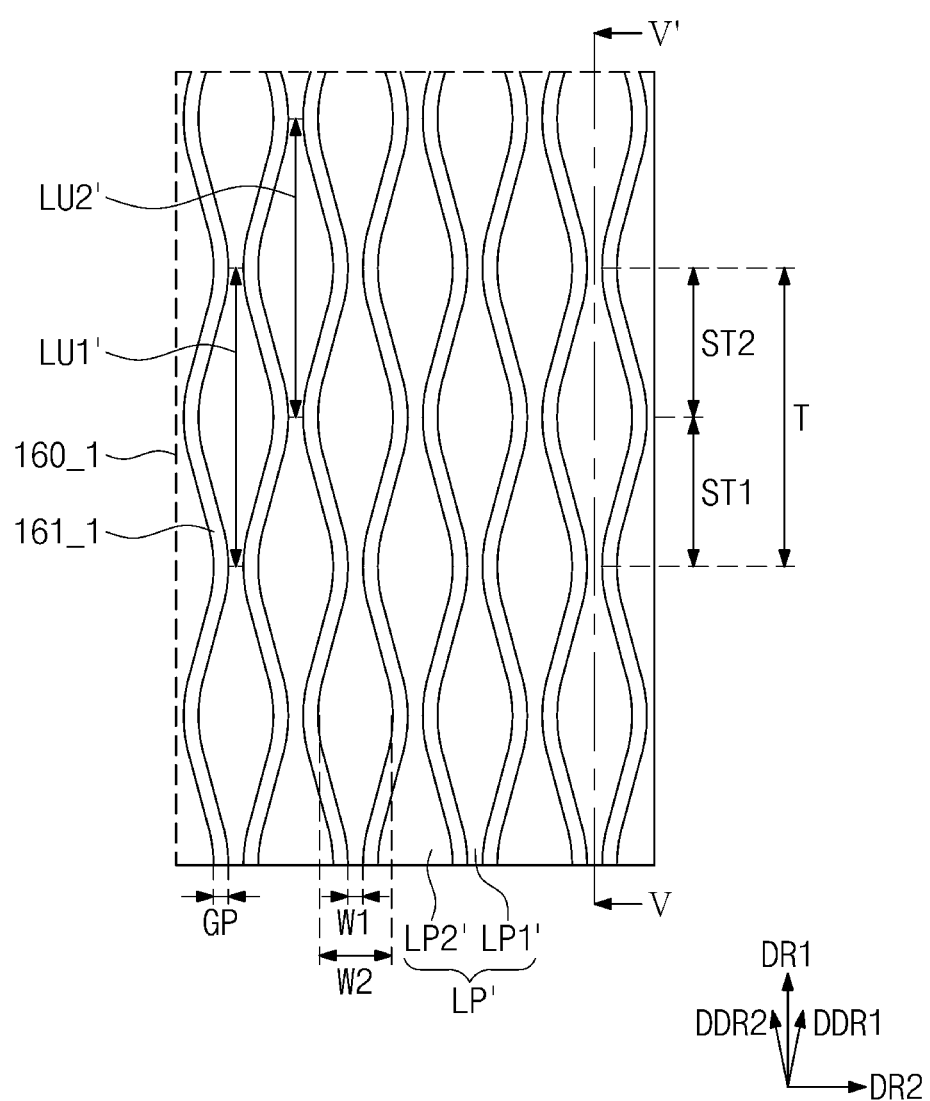
FIG. 14 is a plan view illustrating an exemplary embodiment of lens patterns of the display apparatus.
Figure 15:
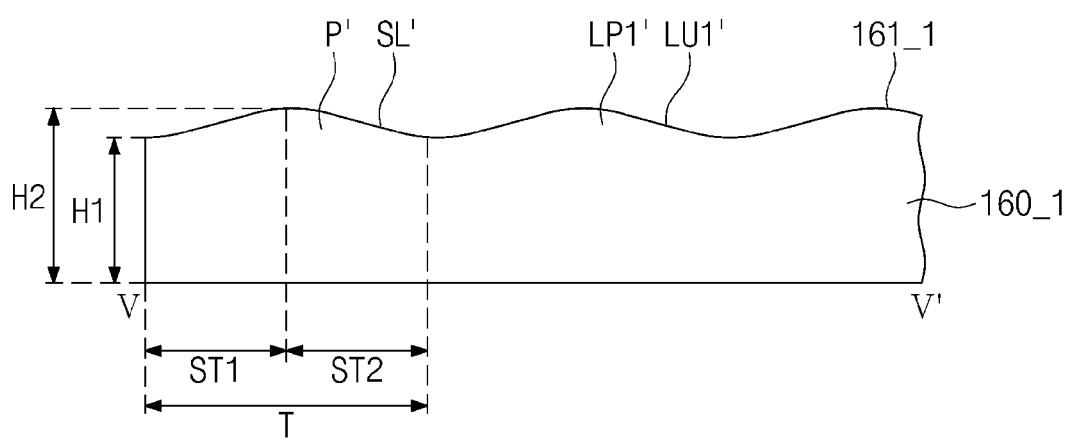
FIG. 15 is a cross-sectional view taken along line V-V' of FIG. 14.
Figure 15:
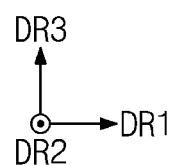

FIG. 14 is a plan view illustrating an exemplary embodiment of lens patterns of the display apparatus. FIG. 15 is a cross-sectional view taken along line V-V' of FIG. 14.

For ease of description, FIG. 14 is illustrated as a plan view corresponding to FIG. 5, and FIG. 15 is illustrated as a cross-sectional view corresponding to FIG. 12.

Referring to FIG. 14, a top surface 161_1 of a light guide plate 160_1 includes a plurality of lens patterns LP' which extend in the first direction DR1 and are arranged in the second direction DR2. The lens patterns LP' include first and second lens patterns LP1' and LP2' disposed to be complementary to each other. Each of the first lens patterns LP1' includes a plurality of first lens units LU1' arranged in the first direction DR1, and each of the second lens patterns LP2' includes a plurality of second lens units LU2' arranged in the first direction DR1. Both sides of each of the first and second lens units LU1' and LU2' facing each other in the second direction DR2 extend to have a curved shape for the first section ST1 and the second section ST2.

In an exemplary embodiment, for example, the both sides, from right to left, of each of the first lens units LU1' respectively extend with the curved shape with respect to the first diagonal direction DDR1 and the second diagonal direction DDR2 for the first section ST1 through the first direction DR1. For the second section ST2, one side, which has extended with the curved shape with respect to the first diagonal direction DDR1 for the first section ST1, extends with the curved shape with respect to the second diagonal direction DDR2, and the other side, which has extended with the curved shape with respect to the second diagonal direction DDR2 for the first section ST1, extends with the curved shape with respect to the first diagonal direction DDR1 through the first direction DR1.

The both sides, from right to left, of each of the second lens units LU2' respectively extend with the curved shape with respect to the second diagonal direction DDR2 and the first diagonal direction DDR1 for the first section ST1. For the second section ST2, one side, which has extended with the curved shape with respect to the second diagonal direction DDR2 for the first section ST1, extends with the curved shape with respect to the first diagonal direction DDR1, and the other side, has extended with the curved shape with respect to the first diagonal direction DDR1 for the first section ST1, extends with the curved shape with respect to the second diagonal direction DDR2 through the first direction DR1.

Referring to FIG. 15, a cross section of each of the first and second lens units LU1' and LU2' taken along the line V-V' has a mountain pattern P'. Because the both sides of each of the first and second lens units LU1' and LU2' extend with the curved shape in the first section ST1 and the second section ST2, an inclined surface SL' of the mountain pattern P' may have a curved shape.

Because other configurations of the first and second lens patterns LP1' and LP2' are substantially the same as those of the first and second lens patterns LP1 and LP2 illustrated in FIG. 5, description thereof is omitted.

Figure 16:
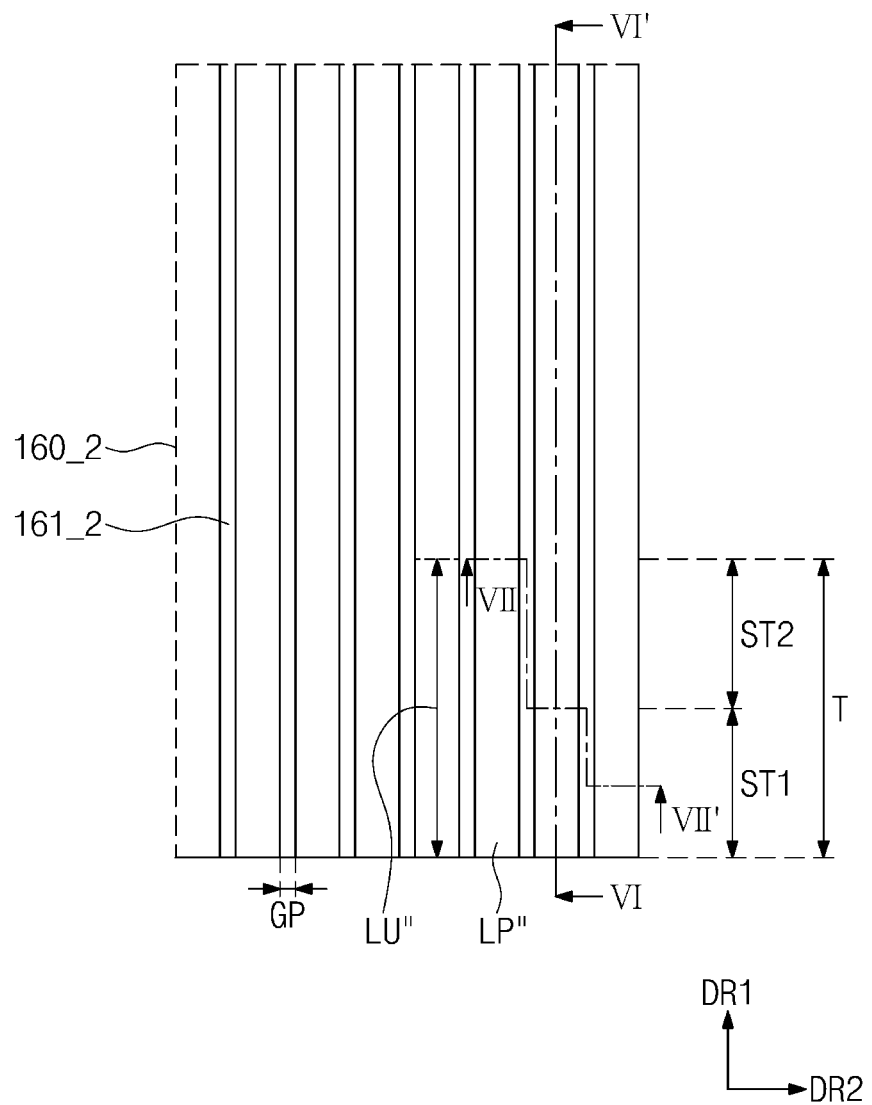
FIG. 16 is a plan view illustrating another exemplary embodiment of lens patterns of the display apparatus.
Figure 17:
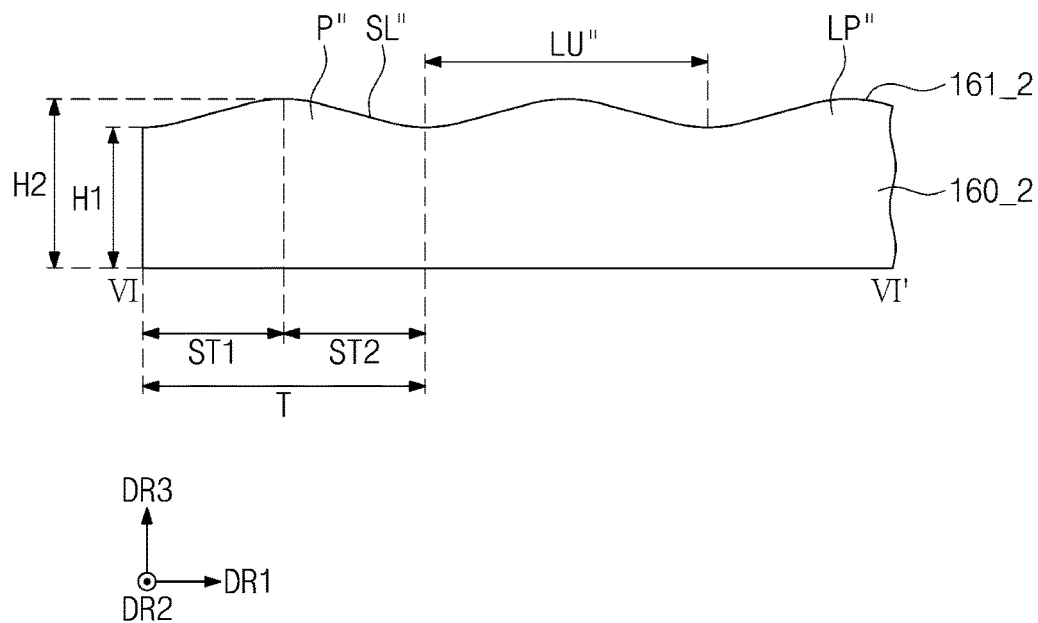
FIG. 17 is a cross-sectional view taken along line VI-VI' of FIG. 16.
Figure 18:
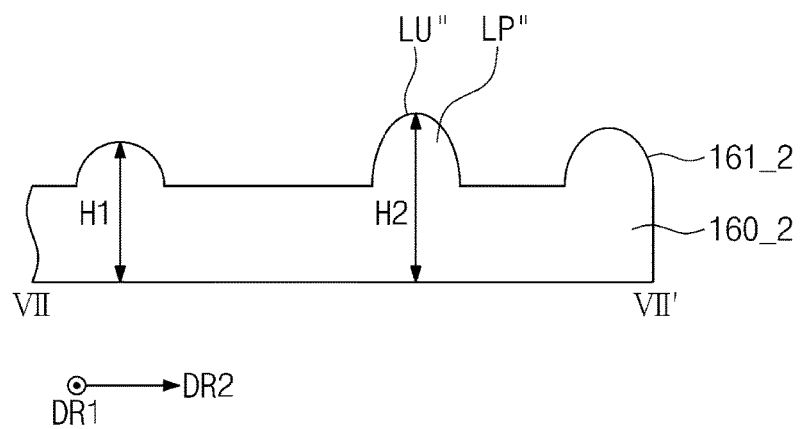
FIG. 18 is a cross-sectional view taken along line VII-VII' of FIG. 16.

FIG. 16 is a plan view illustrating another exemplary embodiment of lens patterns of the display apparatus. FIG. 17 is a cross-sectional view taken along line VI-VI' of FIG. 16. FIG. 18 is a cross-sectional view taken along line VII-VII' of FIG. 16.

Referring to FIGS. 16, 17 and 18, a top surface 161_2 of a light guide plate 160_2 includes a plurality of lens patterns LP''' which extend in the first direction DR1, and are arranged in the second direction DR2. Unlike the first and second lens patterns LP1, LP2, LP1' and LP2' illustrated in FIGS. 5 and 14, a width of the lens patterns LP''' in the second direction DR2 does not vary. The lens patterns LP''' adjacent to each other in the second direction DR2 are disposed to be spaced apart at a predetermined interval GP. Each of the lens patterns LP''' includes a plurality of lens units LU''' arranged in the first direction DR1.

As illustrated in FIG. 18, each of the lens units LU''' may have a convex lens shape. In an exemplary embodiment, for example, a cross section of each of the lens units LU''' taken along the line VII-VII' has the convex lens shape. As illustrated in FIG. 17, a cross section of each of the lens units LU''' taken along line VI-VI' may have a mountain pattern P''', and an inclined surface SL''' of the mountain pattern P''' may have a curved shape.

Because the width of each of the lens patterns LP''' in the second direction DR2 remains the same as the measuring point of the width moves in the first direction DR1, and each of the lens units LU''' has the mountain pattern P''' in the first direction DR1, a curvature of a lens unit LU''' may vary according to region of the lens unit LU''' in the first section ST1 and the second section ST2 in the first direction DR1.

In an exemplary embodiment, for example, portions of the lens unit LU''' at the beginning and the end of the period T may have a semicircular convex lens shape. A portion of the lens unit LU''' at the boundary between the first section ST1 and the second section ST2 of the period T may have an elliptical convex lens shape and have a curvature different from those of the portions of the lens unit LU''' at the beginning and the end of the period T.

Additionally, portions of the lens unit LU''', except for the portions at the beginning and the end of the period T and the portion at the boundary between the first section ST1 and the second section ST2 of the period T, may have an elliptical convex lens shape and have a curvature different from those of the portions of the lens unit LU''' at the beginning and the end of the period T, and the portion of the lens unit LU''' of the boundary between the first section ST1 and the second section ST2 of the period T.

Although the exemplary embodiments of the invention have been described herein, it is understood that various changes and modifications can be made by those skilled in the art within the spirit and scope of the invention defined by the following claims or their equivalents. Also, the exemplary embodiments disclosed in the present disclosure are not intended to limit the scope of the present disclosure, and all technical scopes within the following claims and their equivalents should be interpreted to be included in the scope of right of the present disclosure.

What is claimed is:

1. A backlight unit comprising:
   a light source which generates light; and
   a light guide plate which guides the light provided from the light source in an upward direction,
   wherein a top surface of the light guide plate includes a plurality of first and second lens patterns extending in a first direction, and each of the first lens patterns and each of the second lens patterns are alternately arranged in a second direction crossing the first direction, and
   wherein a width of each of the first lens patterns in the second direction increases gradually from a first width to a second width which is greater than the first width and then decreases gradually from the second width to the first width repeatedly along the first direction.

2. The backlight unit of claim 1, wherein the light source is disposed to be adjacent to either of both sides of the light guide plate facing each other in the first direction.

3. The backlight unit of claim 1, wherein a cross section of each of the first and second lens patterns taken along a first plane perpendicular to the second direction has a plurality of mountain patterns protruding in the upward direction.

4. The backlight unit of claim 1, wherein each of the first lens patterns and each of the second lens patterns are arranged to be spaced apart at a predetermined interval in the second direction.

5. The backlight unit of claim 4, wherein the interval is from about five micrometers to about ten micrometers.

6. The backlight unit of claim 1, wherein
   each of the first lens patterns comprises a plurality of first lens units arranged in the first direction and coupled to each other,
   each of the second lens patterns comprises a plurality of second lens units which have the same shapes as the first lens units, have widths, in the second direction, complementary to widths of the first lens units, and are arranged in the first direction and coupled to each other, and
   a cross section of each of the first and second lens units taken along a second plane perpendicular to the first direction has a convex lens shape convexly protruding in the upward direction.

7. The backlight unit of claim 6, wherein
   a width of each of the first lens units in the second direction gradually increases from the first width to the second width for a first section along the first direction, and gradually decreases from the second width to the first width for a second section which continues from the first section along the first direction, and
   a width of each of the second lens units in the second direction gradually decreases from the second width to the first width for the first section, and gradually increases from the first width to the second width for the second section along the first direction.

8. The backlight unit of claim 7, wherein the length of the first section and the length of the second section are equal.

9. The backlight unit of claim 7, wherein, for the first and second sections, the cross section of each of the first and second lens units has the same shape.

10. The backlight unit of claim 7, wherein a cross section of each of the first and second lens units taken along a first plane perpendicular to the second direction with respect to the highest point of the convex lens shape of each of the first and second lens units has a mountain pattern.

11. The backlight unit of claim 10, wherein
a height of the mountain pattern of each of the first lens units gradually increases from a first height to a second height which is greater than the first height for the first section along the first direction, and gradually decreases from the second height to the first height for the second section along the first section, and
a height of the mountain pattern of each of the second lens units gradually decreases from the second height to the first height for the first section along the first direction, and gradually increases from the first height to the second height for the second section along the first direction.

12. The backlight unit of claim 10, wherein an inclined surface of the mountain pattern of each of the first and second lens units has a predetermined angle with respect to the first direction.

13. The backlight unit of claim 12, wherein the angle is greater than zero degree, and less than or equal to five degrees.

14. The backlight unit of claim 7, wherein both sides of each of the first lens units facing each other in the second direction, and both sides of each of the second lens units facing each other in the second direction extend with a linear shape in the first section and the second section, and are bent at a boundary of the first section and the second section.

15. The backlight unit of claim 7, wherein both sides of each of the first lens units facing each other in the second direction, and both sides of each of the second lens units facing each other in the second direction extend with a curved shape in the first section and the second section, and a cross section of each of the first and second lens units taken along a first plane perpendicular to the second direction with respect to the highest point of the convex lens shape of each of the first and second lens units has a mountain pattern, and an inclined surface of the mountain pattern has a curved shape.

16. A backlight unit comprising:
a light source which generates the light; and
a light guide plate which guides the light provided from the light source in an upward direction of where the display panel is disposed,
wherein a top surface of the light guide plate includes a plurality of first and second lens patterns extending in a first direction, and each of the first lens patterns and each of the second lens patterns are alternately arranged in a second direction crossing the first direction,
wherein a height of each of the first lens patterns increases gradually from a first height to a second height which is greater than the first height and then decreases gradually from the second height to the first height repeatedly along the first direction, and a height of each of the second lens patterns is complementary to the height of each of the first lens patterns,
wherein a width of each of the first lens patterns in the second direction increases gradually from a first width to a second width which is greater than the first width and then decreases gradually from the second width to the first width repeatedly along the first direction.

17. The display apparatus of claim 16, wherein
each of the first lens patterns comprises a plurality of first lens units arranged in the first direction and coupled to each other,
each of the second lens patterns comprises a plurality of second lens units which have the same shapes as the first lens units, have widths complementary to widths of the first lens units in the second direction on the first plane, and are arranged in the first direction and coupled to each other,
a cross section of each of the first and second lens units taken along a second plane perpendicular to the first direction has a convex lens shape convexly protruding in the upward direction, and
a cross section of each of the first and second lens units taken along a first plane perpendicular to the second direction with respect to the highest point of the convex lens shape of each of the first and second lens units has a mountain pattern.

18. The display apparatus of claim 17, wherein
a width of each of the first lens units in the second direction gradually increases from the first width to the second width for a first section along the first direction, and gradually decreases from the second width to the first width for a second section which continues from the first section along the first direction,
a width of each of the second lens units in the second direction gradually decreases from the second width to the first width for the first section along the first direction, and gradually increases from the first width to the second width for the second section along the first direction, and,
for the first and second sections, a cross sectional curvature of each of the first and second lens units taken by the first plane remains the same.

19. The display apparatus of claim 18, wherein
a height of the mountain pattern of each of the first lens units gradually increases from a first height to a second height which is greater than the first height for the first section along the first direction, and gradually decreases from the second height to the first height for the second section along the first section, and
a height of the mountain pattern of each of the second lens units gradually decreases from the second height to the first height for the first section along the first direction, and gradually increases from the first height to the second height for the second section along the first direction.

20. A backlight unit comprising:
a light source which generates light; and
a light guide plate which guides the light provided from the light source in an upward direction,
wherein a top surface of the light guide plate includes a plurality of first and second lens patterns extending in a first direction, and each of the first lens patterns and each of the second lens patterns are alternately arranged in a second direction crossing the first direction,
wherein a width of each of the first lens patterns in the second direction increases gradually from a first width to a second width which is greater than the first width and then decreases gradually from the second width to the first width repeatedly along the first direction, and
wherein a height of each of the first lens patterns increases gradually from a first height to a second height which is greater than the first height and then decreases gradually from the second height to the first height repeatedly along the first direction, and a height of each of the second lens patterns is complementary to the height of each of the first lens patterns.

* * * * *